United States Patent
Raindel et al.

(10) Patent No.: US 9,497,125 B2
(45) Date of Patent: Nov. 15, 2016

(54) CONGESTION CONTROL ENFORCEMENT IN A VIRTUALIZED ENVIRONMENT

(71) Applicant: Mellanox Technologies Ltd., Yokneam (IL)

(72) Inventors: Shachar Raindel, Haifa (IL); Noam Bloch, Bat Shlomo (IL); Liran Liss, Atzmon (IL); Diego Crupnicoff, Buenos Aires (AR); Marina Lipshteyn, Netanya (IL); Adi Menachem, Hod Hasharon (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 142 days.

(21) Appl. No.: 14/338,488

(22) Filed: Jul. 23, 2014

(65) Prior Publication Data

US 2015/0029853 A1  Jan. 29, 2015

Related U.S. Application Data

(60) Provisional application No. 61/859,247, filed on Jul. 28, 2013.

(51) Int. Cl.
| | |
|---|---|
| *H04L 12/801* | (2013.01) |
| *H04L 12/931* | (2013.01) |
| *H04L 12/46* | (2006.01) |

(Continued)

(52) U.S. Cl.
CPC .......... *H04L 47/127* (2013.01); *G06F 3/0662* (2013.01); *G06F 3/0664* (2013.01); *H04L 12/4633* (2013.01); *H04L 49/50* (2013.01); *H04L 49/70* (2013.01); *H04L 47/2441* (2013.01)

(58) Field of Classification Search
CPC ..... G06F 3/0662; G06F 3/0664; G06F 3/066
See application file for complete search history.

(56) References Cited

U.S. PATENT DOCUMENTS

| | | |
|---|---|---|
| 5,400,329 A | 3/1995 | Tokura et al. |
| 6,859,435 B1 | 2/2005 | Lee et al. |

(Continued)

FOREIGN PATENT DOCUMENTS

| | | |
|---|---|---|
| EP | 2068511 A1 | 6/2009 |
| WO | 2009046869 A1 | 4/2009 |
| WO | 2015123988 A1 | 8/2015 |

OTHER PUBLICATIONS

A. Jacquet, T. Moncaster, A. Smith, Re-ECN: Adding Accountability for Causing Congestion to TCP/IP, IETF draft draft-briscoe-tsvwg-re-ecn-tcp-09, pp. 1-50.*

(Continued)

*Primary Examiner* — Christopher Crutchfield
(74) *Attorney, Agent, or Firm* — D.Kligler IP Services Ltd.

(57) ABSTRACT

In a data network congestion control in a virtualized environment is enforced in packet flows to and from virtual machines in a host. A hypervisor and network interface hardware in the host are trusted components. Enforcement comprises estimating congestion states in the data network attributable to respective packet flows, recognizing a new packet that belongs to one of the data packet flows, and using one or more of the trusted components and to make a determination based on the congestion states that the new packet belongs to a congestion-producing packet flow. A congestion-control policy is applied by one or more of the trusted components to the new packet responsively to the determination.

24 Claims, 3 Drawing Sheets

(51) Int. Cl.
*H04L 12/851* (2013.01)
*G06F 3/06* (2006.01)

(56) References Cited

U.S. PATENT DOCUMENTS

| | | | |
|---|---|---|---|
| 7,000,025 B1 | 2/2006 | Wilson | |
| 7,200,116 B2 | 4/2007 | Kobayashi | |
| 7,573,827 B2 | 8/2009 | Santos et al. | |
| 7,602,712 B2 | 10/2009 | Johnsen et al. | |
| 7,706,255 B1 | 4/2010 | Kondrat et al. | |
| 7,839,779 B2 | 11/2010 | Singla et al. | |
| 8,174,978 B2 | 5/2012 | Naven et al. | |
| 8,201,168 B2 | 6/2012 | Haviv et al. | |
| 8,345,548 B2 | 1/2013 | Gusat et al. | |
| 8,391,144 B1 | 3/2013 | Pannell et al. | |
| 8,705,349 B2 | 4/2014 | Bloch et al. | |
| 8,811,183 B1 | 8/2014 | Anand et al. | |
| 8,867,356 B2 | 10/2014 | Bloch et al. | |
| 2003/0026267 A1 | 2/2003 | Oberman et al. | |
| 2006/0045089 A1* | 3/2006 | Bacher | H04L 12/4641 370/392 |
| 2006/0088036 A1 | 4/2006 | De Prezzo | |
| 2008/0056125 A1 | 3/2008 | Kneckt et al. | |
| 2008/0075003 A1 | 3/2008 | Lee et al. | |
| 2008/0232251 A1 | 9/2008 | Hirayama et al. | |
| 2008/0304413 A1* | 12/2008 | Briscoe | H04L 69/16 370/235 |
| 2009/0178037 A1* | 7/2009 | Winter | G06F 9/5077 718/1 |
| 2010/0027420 A1* | 2/2010 | Smith | G06F 9/4856 370/235 |
| 2010/0088437 A1 | 4/2010 | Zahavi | |
| 2011/0032819 A1 | 2/2011 | Schliwa-Bertling et al. | |
| 2011/0242973 A1 | 10/2011 | Ge et al. | |
| 2012/0155276 A1 | 6/2012 | Vasseur et al. | |
| 2012/0195200 A1 | 8/2012 | Regan | |
| 2013/0003538 A1* | 1/2013 | Greenberg | H04L 47/12 370/230 |
| 2013/0289926 A1* | 10/2013 | Maity | G06F 9/5077 702/130 |
| 2014/0064082 A1* | 3/2014 | Yeung | H04L 47/125 370/235 |
| 2014/0185616 A1 | 7/2014 | Bloch et al. | |
| 2014/0269301 A1* | 9/2014 | Rungta | H04L 47/12 370/235 |
| 2014/0269321 A1 | 9/2014 | Kamble et al. | |
| 2015/0055478 A1 | 2/2015 | Tabatabaee et al. | |
| 2015/0372918 A1 | 12/2015 | Zhou et al. | |
| 2016/0014029 A1 | 1/2016 | Yuan et al. | |

OTHER PUBLICATIONS

M. Allman, V. Paxson, E. Blanton, TCP Congestion Control, IETF RFC 5681, pp. 1-18.*
J. Jiang, R. Jain, C. So-In, Forward Explicit Congestion Forward Explicit Congestion Notification (FECN) for Notification (FECN) for Datacenter Ethernet Networks, Mar. 15, 2007, pp. 1-60.*
U.S. Appl. No. 14/052,743 Office Action dated May 21, 2015.
IEEE Standard 802.1Qau for Local and metropolitan area networks—"Virtual Bridged Local Area Networks", Amendment 13: Congestion Notification, pp. 1-135, Apr. 23, 2010.
Infiniband Trade Association, "Infiniband Architecture Specification", vol. 1, release 1.2.1, Annex A10, pp. 1650-1697, Nov. 2007.
IEEE, 802.3, "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for Pause Operation, 12 pages, Jan. 2009.
Elias et al, U.S. Appl. No. 14/052,743 dated Oct. 13, 2013.
U.S. Appl. No. 13/304,654 Office Action dated Nov. 6, 2013.
U.S. Appl. No. 13/304,654 Office Action dated Aug. 2, 2013.
Zahavi et al., "On the Relation Between Congestion Control, Switch Arbitration and Fairness," 11th IEEE/ACM International Symposium on Cluster, Cloud and Grid Computing (CCGrid), pp. 23-26, May 2011.
IEEE Standard 802.1Qbb for Local and metropolitan area networks—"Media Access Control (MAC) Bridges and Virtual Bridged Local Area Networks", Amendment 17: Priority-based Flow Control, pp. 1-40, Sep. 30, 2011.
U.S. Appl. No. 13/245,886 Office Action dated Sep. 30, 2013.
IEEE Standard 802.3 for Information technology—"Telecommunications and information exchange between systems", Local and metropolitan area networks, pp. 1-628, Dec. 9, 2005.
U.S. Appl. No. 13/245,886 Office Action dated May 22, 2013.
Chu et al, "Transmission of IP over InfiniBand (IPoIB)", Network Working Group, RFC 4391, 21 pages, Apr. 2006.
Allman et al, "TCP Congestion Control", Network Working Group, RFC 2581, 14 pages, Apr. 1999.
Ramakrishnan et al, "The Addition of Explicit Congestion Notification (ECN) to IP", Network Working Group, RFC 3168, 63 pages, Sep. 2001.
Sridharan et al, "NVGRE: Network Virtualization using Generic Routing Encapsulation", draft-sridharan-virtualization-nvgre-01. txt, Network Working Group , Internet Draft, 17 pages, Jul. 9, 2012.
Mahalingam et al, "VXLAN: A Framework for Overlaying Virtualized Layer 2 Networks over Layer 3 Networks", draft-mahalingam-dutt-dcops-vxlan-02.txt, Network Working Group, Internet Draft, 20 pages, Aug. 22, 2012.
U.S. Appl. No. 14/052,743 Office Action dated Sep. 29, 2015.
Allman et al., "TCP Congestion Control", Request for Comments (RFC) 5681 of the Internet Engineering Task Force (IETF), 18 pages, Sep. 2009.
U.S. Appl. No. 14/052,743 Office Action dated Mar. 24, 2016.
U.S. Appl. No. 14/052,743 Office Action dated Aug. 8, 2016.

* cited by examiner

CONGESTION CONTROL ENFORCEMENT IN A VIRTUALIZED ENVIRONMENT

CROSS-REFERENCE TO RELATED APPLICATIONS

This Application claims the benefit of U.S. Provisional Application No. 61/859,247, filed Jul. 28, 2013, which is herein incorporated by reference.

BACKGROUND OF THE INVENTION

1. Field of the Invention

This invention relates to communication networks. More particularly, this invention relates and particularly to congestion control in communication network virtualization.

2. Description of the Related Art

The meanings of certain acronyms and abbreviations used herein are given in Table 1.

TABLE 1

Acronyms and Abbreviations

| | |
|---|---|
| ARP | Address Resolution Protocol |
| CNM | Congestion-notification message |
| DCTCP | Datacenter TCP |
| ECN | Explicit Congestion Notification |
| IB | InfiniBand |
| IETF | Internet Engineering Task Force |
| IP | Internet Protocol; Also Internet Protocol Address |
| NIC | Network Interface Card |
| NVGRE | Network Virtualization using Generic Routing Encapsulation |
| OSI | Open Systems Interconnection |
| QCN | Quantized Congestion Notification |
| QP | Queue Pair (a transmit queue and a receive queue) |
| RFC | Request for Comments |
| SRIOV | Single-Root I/O virtualization |
| TCP | Transmission Control Protocol |
| UDP | User Datagram Protocol |
| VIOC | Virtual Input-Output Connection |
| VM | Virtual Machine |
| VXLAN | Virtual eXtensible Local Area Network |

Network virtualization involves creating virtual OSI Layer-2 and/or Layer-3 topologies on top of an arbitrary physical (Layer-2 or Layer-3) network. Network Virtualization decouples virtual networks and addresses from physical network infrastructure, providing isolation and concurrency between multiple virtual networks on the same physical network infrastructure. Such virtualized networks can be used, for example, in data centers and cloud computing services. Virtualized networks of this sort are commonly referred to as "overlay networks" or "tenant networks".

When performing network communication, there can be congestion in the network. The following are typical scenarios:

(1) Multiple senders send traffic to the same receiver.

(2) A receiver is slower than the originating traffic sender.

(3) Multiple flows share the same link inside the network fabric.

In the event of such congestion, network switches can buffer the traffic up to a limit, after which they either cause backpressure or drop part of the traffic. Both of these actions can harm performance—dropping traffic will cause a retransmission, while applying backpressure and stopping the originating switch will cause congestion to spread, possibly slowing down the entire network.

Some communication networks apply congestion-control mechanisms for mitigating traffic congestion in the network. For example, congestion control for Infiniband™ networks is specified in *InfiniBand Architecture Specification Volume 1*, release 1.2.1, Annex A10, November, 2007, pages 1650-1697, which is incorporated herein by reference.

As another example, congestion control for Ethernet™ networks is specified in IEEE Standard 802.1Qau-2010, entitled *IEEE Standard for Local and Metropolitan Area Networks-Virtual Bridged Local Area Networks; Amendment* 13: *Congestion Notification*, Apr. 23, 2010, which is incorporated herein by reference.

Another approach to congestion control is disclosed in RFC 2581, dealing with TCP window control. The sender or source host keeps track of the number of packets sent to the network that are unacknowledged by the receiving host. The number of packets that are allowed to be in flight, and not acknowledged, has a limit that depends upon estimation by the source host of the congestion situation in the network. The source host treats packet loss or increase in the round trip time as a signal for congestion, while successfully acknowledged packets and decreasing or stable round trip time are treated as indicating a lack of congestion.

Both Explicit Congestion Notification (ECN), defined in RFC 3168, and DCTCP congestion control also use a congestion window, but decide upon the congestion window size using explicit marking. A switch, instead of dropping packets, marks the packets as "congestion encountered", using a special bit in the packet header. The receiving host uses the special field in the acknowledgement packets it sends to the source to indicate that it received a packet marked with congestion encountered.

Commonly assigned U.S. Pat. No. 8,705,349 to Bloch et al., which is herein incorporated by reference, describes regulation of the transmission rate of packets selectively, based on destination address. A source network interface identifies the destination address of packets that triggered a notification and were marked by the network element. The source network interface then regulates the transmission rate of subsequent packets that are addressed to the identified destination address, e.g., by forcing a certain inter-packet delay between successive packets.

A number of protocols have been developed to support network virtualization. For example, Sridharan et al. describe the NVGRE virtualization protocol in an Internet Draft entitled "NVGRE: Network Virtualization using Generic Routing Encapsulation," draft-sridharanvirtualization-nvgre-01 (Jul. 9, 2012), published by the Internet Engineering Task Force (IETF). Another network virtualization protocol is VXLAN (Virtual eXtensible Local Area Network), which is described by Mahalingam et al. in an Internet Draft entitled "VXLAN: A Framework for Overlaying Virtualized Layer 2 Networks over Layer 3 Networks," published by the IETF as draft-mahalingam1058-1073S1 2 dutt-dcops-vxlan-02 (Aug. 22, 2012). These protocols are directed to virtualization and encapsulation of Layer 2 communications (such as Ethernet™ links) over Internet Protocol (IP) networks.

Attempts have also been made to provide a framework for encapsulation and transmission of various protocols over InfiniBand™ (IB) networks. For example, Chu and Kashyap describe a method for encapsulating and transmitting IP and Address Resolution Protocol (ARP) packets over IB in "Transmission of IP over InfiniBand (IPoIB)," published in 2006 as IETF RFC 4391. This document specifies the link-layer address to be used when resolving IP addresses in IB subnets and the setup and configuration of IPoIB links.

The congestion control protocols mentioned above assume that all parties are following them, meaning that a misbehaving party could abuse the system and preempt an unfair share of the available bandwidth. This becomes especially problematic in a cloud environment, where the tenants are untrusted, while the service provider would want to provide well-behaving clients with a lossless network.

For example, U.S. Pat. No. 8,201,168 describes the use of virtual input-output connections for machine virtualization. A virtual computer system includes at least one virtual or physical compute node, which produces data packets having respective source attributes. At least one virtual input-output connection (VIOC) is uniquely associated with the values of the source attributes. The virtual computer system is implemented on a physical computer system, which includes at least one physical packet switching element. The physical packet switching element is configured to identify the data packets whose source attributes have the values that are associated with the VIOC and to perform operations on the identified data packets so as to enforce a policy with regard to the VIOC.

An additional challenge in this respect is the fact that SRIOV acceleration, which is used in some virtualized environments, prevents the hypervisor (which is a trusted entity) from seeing and being able to control most of the sent traffic, as the guest virtual machine, which is not necessarily trusted, is allowed to communicate directly with the hardware.

Currently, to ensure service level, a cloud provider might define a limit for the bandwidth a virtual machine (VM) is consuming, and track for each user the number of transferred bytes. Such tracking may disregard physical or logical distance between a transmitter and receiver, or may employ a metric of a physical or logical distance, or both, that bytes travel. While most modern network hardware support priority definition between a small number of traffic classes, this feature is not commonly used in cloud computing solutions, due to the highly limited number of queues, which imposes an extremely low limit on the number of traffic classes.

Some congestion control protocols also suffer from issues regarding fairness in allocation of resources among different flows, with some of the flows ending up getting a share that is either considerably bigger or smaller than what the user is expecting. For example, in FIG. 1, circumstances might result in one source host sending at 60% line rate, a second source host sending at 30% line rate and a third source host 10 sending at 10%.

Another challenge is the convergence time—the amount of time it takes for the congestion control protocol to reach a stable state after a change in the network topology or flow patterns.

Finally, a congestion control protocol might suffer from oscillations (lack of stability), where the transmission rate or window is repeatedly increased and decreased with significant amplitude.

Some existing congestion control protocols use additive increase, multiplicative decrease rate-control schemes, where a value is added to the rate after a certain amount of time has passed without congestion notification, and upon receiving a congestion notification the rate is decreased by a specific multiplier.

SUMMARY OF THE INVENTION

Embodiments of the present invention provide the following innovations in a virtualized network environment:

(1) A mechanism for enforcing congestion control upon possibly non-cooperative tenants, using technical rate limitation means or financial means to charge offenders; and (2) Mechanisms that can be used as part of congestion control protocols, to improve the fairness, convergence time and stability.

The first mechanism relies on the hypervisor, the virtual switch or the network interface to perform independent congestion control, based on signaling that is mostly independent from the signaling done by the untrusted tenant. Another alternative mechanism utilizes congestion control signaling for charging the relevant client.

There is provided according to embodiments of the invention a method for communication, which is carried out by supporting a plurality of virtual machines in a host. The host includes a hypervisor and network interface hardware, which are both trusted components. The method is further carried out by communicating data packet flows to and from the virtual machines over a data network via the network interface hardware, estimating congestion states in the data network attributable to respective packet flows, recognizing a new packet that belongs to one of the data packet flows, and making a determination based on the congestion states that the new packet belongs to a congestion-producing packet flow. The method is further carried out by applying a congestion-control policy to the new packet responsively to the determination, wherein making a determination and applying a congestion-control policy are performed by one or more of the trusted components.

According to one aspect of the method, applying a congestion-control policy is performed by the hypervisor.

According to another aspect of the method, applying a congestion-control policy is performed by the network interface hardware.

According to an additional aspect of the method, the new packet is received from the data network, and applying a congestion-control policy includes sending a congestion-notification message to a source of the new packet.

According to another aspect of the method, the congestion-notification message is a coalescence of a plurality of congestion-notification messages.

An additional aspect of the method includes delaying transmission of the congestion-notification message according to a class-based delay interval.

One aspect of the method includes falsifying the congestion-notification message by one or more of the trusted components.

Still another aspect of the method includes sending a second congestion-notification message only after a predetermined time interval has elapsed since sending a first congestion-notification message.

A further aspect of the method includes updating the congestion states using one or more of the trusted components responsively to recognizing a failure of the new packet to arrive within a predetermined time interval.

According to still another aspect of the method, the new packet originates from one of the virtual machines, and the congestion-control policy includes delaying the new packet according to the congestion state attributable to the packet flow thereof.

According to another aspect of the method, the new packet originates from one of the virtual machines, and the congestion-control policy includes imposing a rate limitation.

According to a further aspect of the method, the new packet originates from one of the virtual machines, and the congestion-control policy includes modifying the content of the new packet.

According to yet another aspect of the method, the new packet originates from one of the virtual machines, and the congestion-control policy includes dropping the new packet when the new packet is outside a congestion window.

According to one aspect of the method, the new packet originates from one of the virtual machines, and the congestion-control policy includes determining that the new packet is outside a congestion window, and thereafter delaying transmission of the new packet until the new packet is no longer outside the congestion window.

Another aspect of the method includes determining that one of the virtual machines has exceeded a predetermined congestion metric, and thereafter migrating the one virtual machine to another host.

A further aspect of the method includes using the congestion state as an input for a financial charging mechanism.

There is further provided according to embodiments of the invention a computer system, including a memory, a host processor configured to access the memory and to run one or more virtual machines. The system includes a hypervisor and network interface hardware, which is configured to transmit and receive data packets over a data network, The hypervisor and the network interface hardware are trusted components, and the host processor is co-operative with the network interface hardware for communicating data packet flows to and from the virtual machines over the data network via the network interface hardware, estimating congestion states in the data network attributable to respective packet flows, recognizing a new packet that belongs to one of the data packet flows, making a determination based on the congestion states that the new packet belongs to a congestion-producing packet flow, and applying a congestion-control policy to the new packet responsively to the determination, wherein making a determination and applying a congestion-control policy are performed by one or more of the trusted components.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
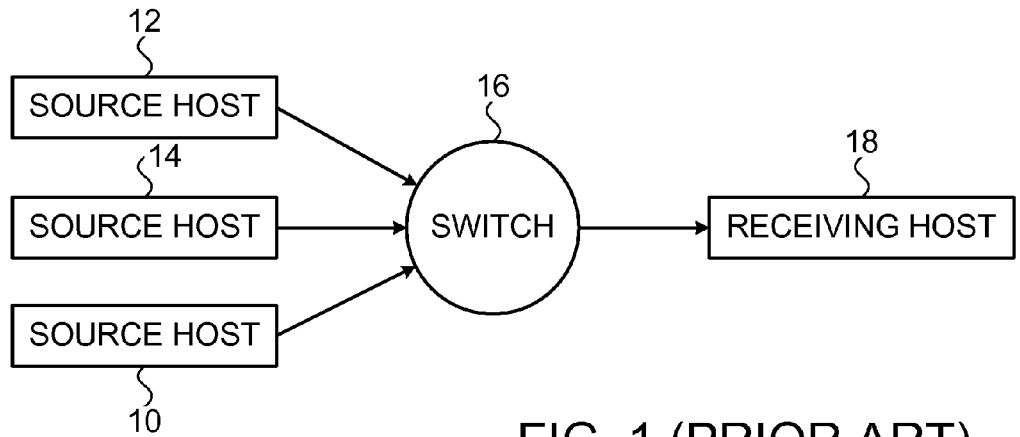
FIG. 1 is a block diagram illustrating a scenario in a network environment in accordance with the prior art.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory media for use with a data processing system, such as a flash memory, hard drive, electronic media or CD-ROM. The code may be distributed on such media, or may be distributed to users from the memory or storage of one computer system over a network of some type to storage devices on other computer systems for use by users of such other systems.

DEFINITIONS

As used herein, the term "packet" does not imply any particular transmission protocol and can refer to units or segments of data in a system using, for example, anyone or combination of the above-listed data transmission protocols (or other protocols). "IP" is only an example of a type of protocol.

As used herein, the terms "packet flow" or "flow" refers to a sequence of packets, which might share a fate to some extent. The exact reason for fate sharing and mechanism used for determining such fate sharing might vary in different implementations. Examples for flow definitions (based upon the QCN standard text, section 30.3) follow:

a) All the frames carrying data for a single User Datagram Protocol (UDP, IETF RFC 768, STD0006) connection.

b) All of the frames generated by a particular process running in an (physical or virtual) end station.

c) All of the frames being transmitted by an end station that produce the same value when a hash computation is performed on the source and destination IP addresses, UDP vs. TCP selection, and source and destination UDP/TCP port numbers of the IP packets carried by those frames.

d) All of the frames originating from a particular source that have the same destination address parameter.

e) All of the frames being transmitted by a particular source (physical or virtual)

f) All of the frames passing through a single packet switching mechanism sharing identical source address, destination address, and priority parameters.

g) All of the frames that contain IP packets, and have identical values for their source and destination IP addresses, UDP vs. TCP selection, and source and destination UDP/TCP port numbers.

The term "network" is intended to represent any of a variety of conventional network topologies and types (including wired and wireless networks) employing any of a variety of conventional network protocols (including public and/or proprietary protocols). The term network may include, for example, the Internet as well as at least portions of one or more local area networks and wide area networks in many combinations.

Overview.

Embodiments of the present invention that are described hereinbelow therefore provide methods and apparatus that can be used effectively in network virtualization over Infini-Band (IB), as well as other sorts of underlying networks. Although the embodiments that are described hereinbelow relate specifically, for the sake of clarity, to the use of IB as an underlying network, however, features of these embodiments may similarly be applied, mutatis mutandis, over underlying networks of other sorts, such as Ethernet, IP and Fibre Channel networks.

Turning now to the drawings, Reference is initially made to FIG. 1, which is a block diagram illustrating a scenario in a network environment for which congestion control enforcement may be applied in accordance with an embodiment of the invention. Source hosts 10, 12, 14 (sometimes referred to herein as "sending hosts") send traffic through switch 16 to receiving host 18. It is assumed that at least a portion of the source hosts 10, 12, 14 comprise virtual machines, e.g., hypervisors in which a plurality of guest operating systems may be active. If the switch prevents the source hosts 10, 12, 14 from transmitting traffic when the switch buffer is full, traffic going from host 12 to host 14 will be sent at ⅓ of the link speed, instead of the theoretical limit of ⅔ of the link speed. This phenomenon is known as "victim flow". In the alternative case, where the switch 16 is dropping packets when it runs out of space, assuming the source hosts 10, 12, 14 do not perform congestion control; only ⅓ of the packets will reach the receiving host, causing severe performance degradation.

First Embodiment

Figure 2:
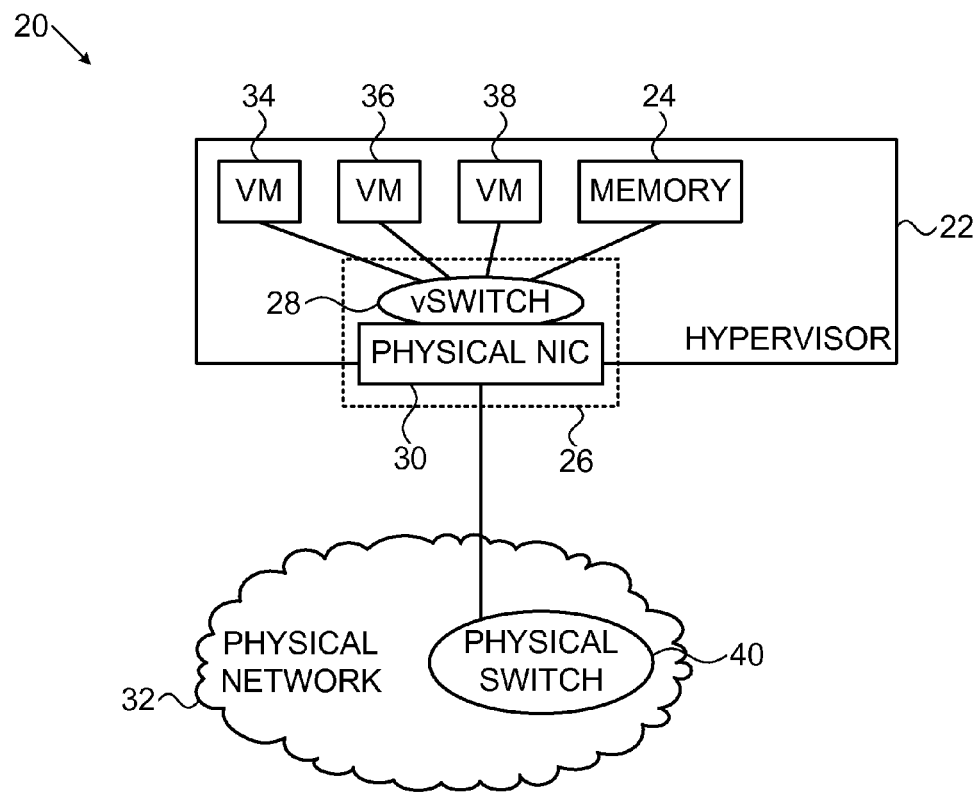
FIG. 2 is a detailed block diagram of a virtualized network environment adapted to congestion, in accordance with an embodiment of the invention.

Reference is now made to FIG. 2, which is a detailed block diagram of a virtualized network environment subject to congestion control, in accordance with an embodiment of the invention. A host processor 20 comprises a hypervisor 22 and is configured to access suitable memory 24. The host processor 20 includes network interface hardware 26, a network interface card 30 (NIC) configured to transmit and receive data packets over a physical data network 32. The network interface hardware 26 may comprise a virtual switch 28 as shown in FIG. 2. Alternatively, the virtual switch 28 may be an element of the hypervisor 22 and in some embodiments may be realized as multiple virtual switches. The hypervisor 22 may support any number of virtual machines (VMs), here represented by three virtual machines 34, 36, 38. The hypervisor 22 is linked to a physical switch 40 interfacing the data network 32. Upon reception from the network of packets that have been marked to indicate congestion encountered by the switch 40 or deeper parts of the physical data network 32, congestion-notification messages are sent to the source of the packet.

The virtual switch 28, network interface card 30 and hypervisor 22 are referred to herein as the "trusted components", i.e., they are inherently secure, available, and reliable, individually and in aggregate. The following actions may be delegated to any one of the trusted components, or may be divided among them in many combinations:

The trusted components intercept congestion messages or indication regarding packets, after which the trusted components, or one of them, for example the virtual switch 28, sends congestion-notification message or similar signals to the sources of the packets.

When it is known or assumed that the hypervisor 22 is running untrusted guests or, additionally or alternatively, one or more of the virtual machines 34, 36, 38 is itself a nested virtualization server running untrusted guests, the trusted components update an estimate of the congestion states attributable to respective packet flows). The estimate can be, for example a DCTCP-like congestion state estimation. This flow might be performed also by a physical machine, which does not utilizes virtualization or which is trust, for example when this machine is providing services over the network to untrusted components.

Based on this estimation, the trusted components limit the rate at which the relevant packet flow is transmitted or limit the number of unacknowledged packets transmitted for this flow. For example, a fake congestion-notification message (CNM) such as a quantized congestion notification (QCN) may be generated. This may be accomplished using additional logic. For example, the DCTCP congestion estimation may be exploited to generate a quantized congestion notification (QCN). A known QCN state machine may be executed to determine transmission rate limitations.

Alternatively, for a packet flow that is a TCP/IP stream, the number of TCP packets that were transmitted but not yet acknowledged may be tracked. This number may be limited by delaying transmission of additional packets, in accordance with a congestion window management scheme similar to the one described in RFCs 2581 and 3186.

Figure 3:
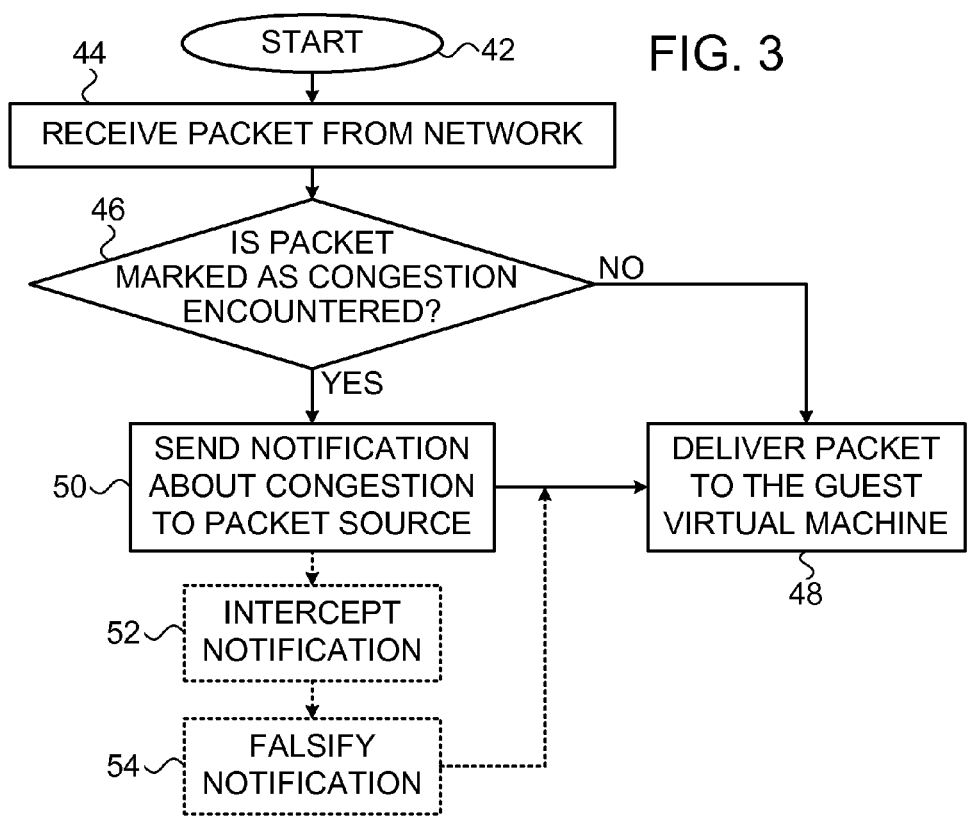
FIG. 3 is a detailed flow-chart for receiving a congestion-producing flow from a network, in accordance with an embodiment of the invention.

Reference is now made to FIG. 3, which is a detailed flow-chart for receiving a congestion-producing flow from a network, in accordance with an embodiment of the invention. The procedure begins at initial step 42.

At step 44, a new packet is received from the network, originating from a virtual machine. The new packet is recognized in the network interface hardware 26, and thereafter analyzed and processed in one or more of the trusted components.

Next, at decision step 46, it is determined if the packet identified in step 44 belongs to a flow subject to congestion limitations. This may be done by noting explicit marking of the packet, which may be supplied by the virtual switch 28 (FIG. 1). Alternatively, the trusted components may keep track of the TCP sequence numbers of the TCP connections going through the network. In such case, congestion notifications originating from the trusted components may be triggered by out-of-order events, e.g., packet loss. Such packet drop usually occurs in the physical switch 40 (FIG. 2). Additionally or alternatively packet drop may occur in the virtual switch as well, e.g., if multiple VMs using the same physical interface are queuing packets for transmission above the rate at which the physical interface can transmit the packets.

If the determination at decision step 46 is negative then control proceeds to final step 48. The packet is delivered to the guest virtual machine, e.g., one of the virtual machines 34, 36, 38 (FIG. 2). Alternatively, the packet may be delivered to the hypervisor 22.

If the determination at decision step 46 is affirmative then control proceeds to step 50. A congestion-notification message is addressed to the source of the packet. Typically, the congestion-notification messages are sent to the network address of the traffic source. Other possible targets for the congestion-notification messages can be, inter alia, the guest virtual machine or the host hypervisor.

The contents of the message may conform to a governing policy appropriate to the congestion level of the flow. The congestion-notification message may be sent immediately. Alternatively, there may be a class-based delay, e.g., imposed for particular flows, destinations or ports. The congestion-notification message may comprise a coalescence into a single notification message of multiple notifications about packets belonging to the same packet flow or arriving from the same source.

The congestion-notification message may constitute no more a single bit indicating a status, e.g., an indication that "there is congestion on the path to this physical host". Alternatively, the congestion-notification message may be a more detailed report providing information such as the details of the flows involved in the congestion: the number of packets marked as congestion-encountered that are received for each flow; the number of packets received for each flow; and timing information.

After performing step 50, the following optional steps may be performed. In optional step 52, the trusted components intercept the notification generated in step 50 and update an estimate of the congestion state. Then in optional step 54 the notification is falsified in order to obfuscate the current congestion estimation of the trusted components. Optional step 52 may comprise modification of time stamp values in the TCP packet header to indicate congestion. The purpose of optional step 54 is to ensure that a misbehaving guest does not unduly benefit from the available bandwidth.

Optional step 54 may comprise piggybacking on the TCP ACK packets that the guest is sending to signal the congestion encountered. RFC 3168 defines how to relay this information among TCP ACK options.

Alternatively, optional step 54 may comprise modifying the ACK packet to be a "duplicate ACK" packet, signaling packet loss, ("fast recovery" according to the well-known TCP Reno congestion control protocol). This operation is performed on a subsequently transmitted TCP ACK packet in the same stream, and not on the currently received TCP packet.

Further alternatively, optional step 54 may comprise delaying or dropping the currently received TCP packet to enforce a similar behavior.

Final step 48 is then performed, using the output of step 50 or the falsified notification of optional step 54, as the case may be.

Figure 4:
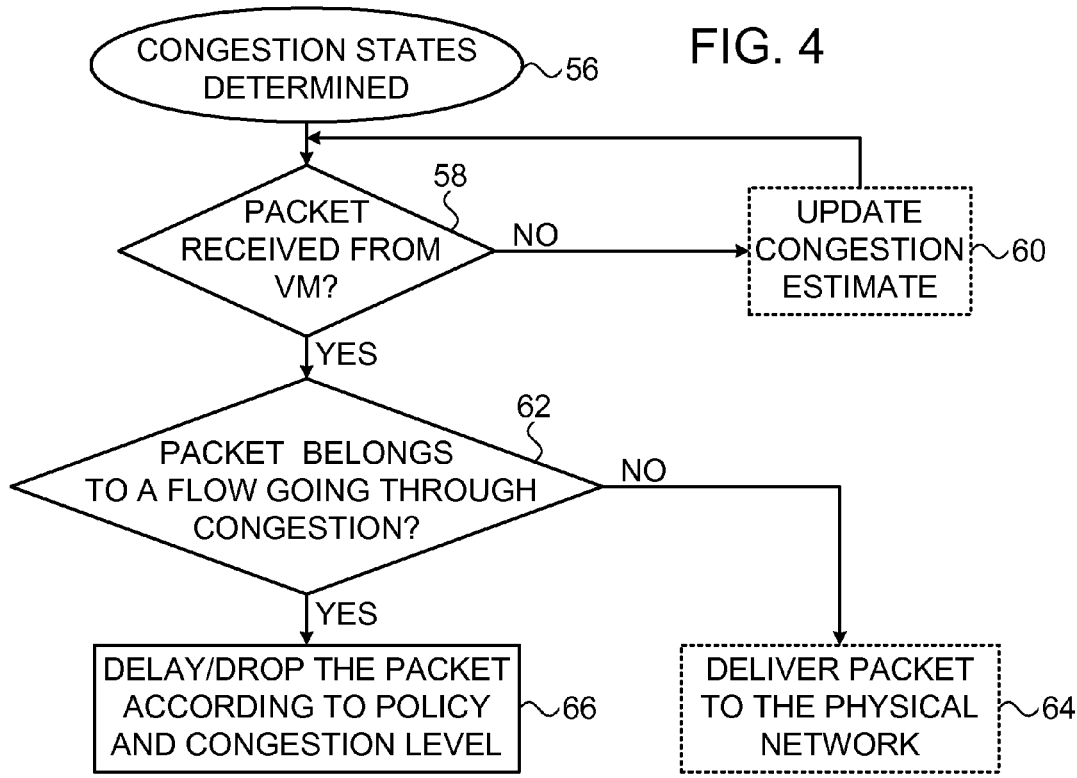
FIG. 4 is a detailed flow-chart illustrating a logic for transmitting packets to a congested physical network in accordance with an embodiment of the invention.

Reference is now made to FIG. 4, which is a detailed flow-chart illustrating logic for transmitting packets to a physical network in accordance with an embodiment of the invention. One or more of the trusted components enforces congestion limitations upon the flow, for example by counting the number of packets transmitted by the flow in a specific time interval, and preventing it from sending more than a given number of packets during the interval. The network is monitored for new packets by one or more of the trusted components.

At initial step 56, the network is monitored by one or more of the trusted components. It is assumed that congestion notifications are in force.

Next at delay step 58 arrival of a packet from a virtual machine or the hypervisor is awaited, e.g., the hypervisor 22 or one of the virtual machines 34, 36, 38 (FIG. 2). If a packet has not arrived, the congestion estimate may be updated in optional step 60. The update is typically triggered by an event such as failure of a congestion-notification message to be received within a predetermined time interval or an adaptively determined time interval according to network latency. Such an event may indicate amelioration of the network congestion status.

After a packet is received in delay step 58, then, at decision step 62, it is determined if the packet belongs to a flow subject to congestion limitations. If the determination is negative, then control proceeds to final step 64. The packet is delivered to the physical network.

If the determination at decision step 62 is affirmative then control proceeds to final step 66. The packet is treated according to the congestion-control policy appropriate to the congestion level of the flow. For example, the packet may be delayed sufficiently to achieve a predetermined limited packet transmission rate, placed at the end of a queue, or even dropped entirely.

In some embodiments, the trusted components may perform final step 66 using a policing mechanism, e.g., a policy of dropping packets that are provided by the guest operating system above the allowed rate for a relevant flow or maintaining a TCP-like congestion window, and enforcing the policy upon the guest for each flow sent. As noted above, the trusted components for this function may comprise one or a combination of the trusted components, Possible enforcement mechanisms can include, inter alia, delaying packets that do not fit into the congestion window until such time as they do, or dropping such packets.

The sending element may use SR-10V to provide tenants with direct network access. For example, in FIG. 2, the hypervisor 22 and/or the virtual machines 34, 36, 38 may communicate directly with the network interface hardware 26. In such embodiments, the network interface hardware 26 can provide the hypervisor 22 with an indication of marked packets and a software-controlled rate limiter per flow. Alternatively, there may be a full implementation of the congestion-control mechanisms described above in the network interface hardware 26, in other firmware, or any combination thereof.

The network interface hardware 26 can enforce classification of traffic from the VM to an appropriate queue/logical flow by enforcing a specific hashing scheme, such as hash (destination IP, destination port) % number of queus/flows), where "%" is the modulus operator. Packets that do not match the appropriate hash are dropped or reported to the hypervisor 22.

In another implementation, the network interface hardware 26 enforces a rate limiter that is based on a packet classification performed in the network interface card 30 or the virtual switch 28.

Alternatively, either or both the rate limitation function and the congestion reporting/estimation may be offloaded to the physical switch 40, for example by tagging the packets with tenant IDs in the case of a multi-tenant access network system before sending them to the data network 32.

Second Embodiment

Referring again to FIG. 3 and FIG. 4, performance of step 50 and final step 66 indicate non-compliance with the congestion-control mechanism. These steps may include a signal to a billing system, charging users based upon the amount of congestion encountered. This approach can create a financial incentive to comply with congestion control policies.

Third Embodiment

Reverting to FIG. 3, step 50 may provide a graphical indication of VMs that cause congestion, and can be used as an input for VM migration decision processes. For example, if a VM produces a large amount of congestion on a current machine, e.g., a predetermined percentage of the network bandwidth, recognition of server overload may indicate migrating the VMs that cause the most congestion. This approach can help to reduce the number of congested links in the network. One congestion metric for purpose of step 50 is a ranking in each hypervisor according to congestion control limitations of its respective flows. A VM having more than a given percentage of its flows subject to congestion control restrictions becomes a candidate for migration.

Fourth Embodiment

Reverting to FIG. 4, when, during performance of final step 66, the congestion-control mechanism reduces the rate/window due to a congestion indication (marked packet, dropped packet, other marking), the congestion-notification message may reflect application of a multiplier that is a function of the current rate. For example, assuming a maximal wire speed (FWS), and a flow currently limited to a rate X, a notification about congestion will decrease the rate to a value X/(1+(X/FWS)) (instead of X/2 as is in traditional schemes).

Fifth Embodiment

As noted above, a predetermined delay in providing a congestion-notification message may be imposed for particular flow levels, destination levels or port levels. The delay can be approximately the length of round trip time, or long enough to allow the congestion control feedback loop to stabilize. Values varying from 10-100 microseconds up to several milliseconds are typical. In this embodiment the host (e.g., host processor 20 (FIG. 1)), which is the receiver of the flow, performs rate limiting in accordance with the congestion-notification messages that it returns.

Figure 5:
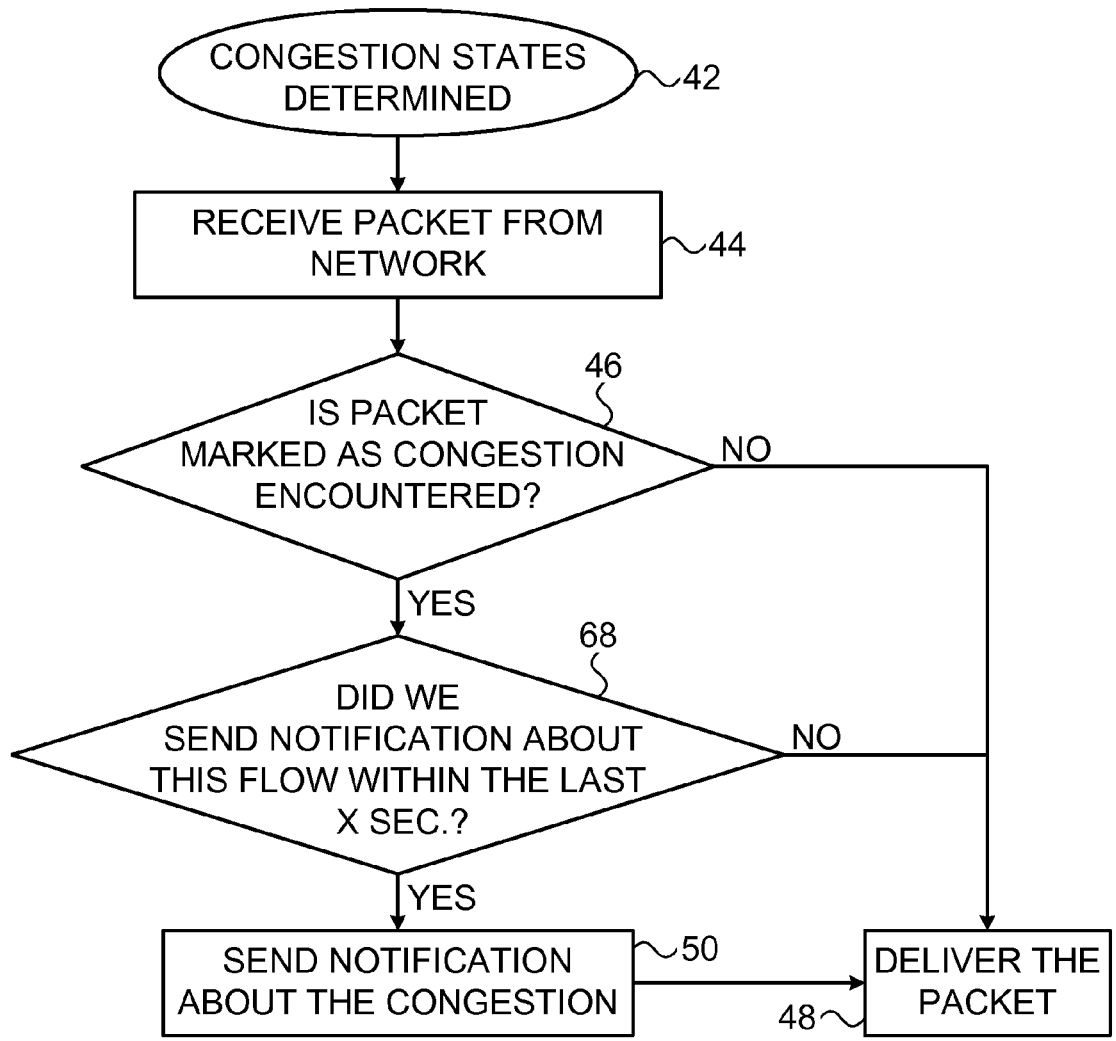
FIG. 5 is a flow-chart of a method for transmitting congestion-notification messages in accordance with an embodiment of the invention.

Reference is now made to FIG. 5, which is a flow-chart of a method for transmitting congestion-notification messages in accordance with an embodiment of the invention. For a given flow, the procedure requires a time interval to elapse between successive congestion-notification messages.

The method includes several steps in common with the method described with respect to FIG. 3. The details are not repeated in the interest of brevity. After performing initial step 42, step 44 and decision step 46, when the determination at decision step 46 is affirmative, then, at decision step 68, it is determined if an interval of at least a predetermined time interval (X) has elapsed since a previous congestion-notification message was transmitted in respect of the flow to which the packet received in step 44 belongs.

If the determination at decision step 68 is affirmative then control proceeds to step 50, and a new congestion-notification message is generated. Otherwise final step 48 is performed.

This method advantageously reduces oscillation of the rate limitation for the flow, as it prevents over-reduction of the rate due to a single congestion event.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for communication, comprising the steps of:
supporting a plurality of virtual machines in a host, wherein the host comprises a hypervisor, and network interface hardware, the hypervisor and the network interface hardware being trusted components;
communicating data packet flows to and from the virtual machines over a data network via the network interface hardware;
estimating congestion states in the data network attributable to respective packet flows;
recognizing a new packet that belongs to one of the data packet flows;
making a determination based on the congestion states that the new packet belongs to a congestion-producing packet flow; and
applying a congestion-control policy to the new packet responsively to the determination, wherein the steps of making a determination and applying a congestion-control policy are performed by one or more of the trusted components, and wherein applying a congestion-control policy comprises sending a congestion-notification message to a source of the new packet, transmission of the congestion-notification message being delayed according to a class-based delay interval.

2. The method according to claim 1, wherein applying a congestion-control policy is performed by the hypervisor.

3. The method according to claim 1, wherein applying a congestion-control policy is performed by the network interface hardware.

4. The method according to claim 1, wherein the congestion-notification message comprises a coalescence of a plurality of congestion-notification messages.

5. The method according to claim 1, further comprising sending a second congestion-notification message only after elapse of a predetermined time interval after sending a first congestion-notification message.

6. The method according to claim 1, further comprising the steps of:
recognizing a failure of the new packet to arrive within a predetermined time interval; and
updating the congestion states using one or more of the trusted components responsively to recognizing a failure.

7. The method according to claim 1, wherein the new packet originates from one of the virtual machines, and wherein applying a congestion-control policy comprises delaying the new packet according to the congestion state attributable to the packet flow thereof.

8. The method according to claim 1, wherein the new packet originates from one of the virtual machines, and wherein applying a congestion-control policy comprises imposing a rate limitation.

9. The method according to claim 1, wherein the new packet originates from one of the virtual machines, and wherein applying a congestion-control policy comprises modifying a content of the new packet.

10. The method according to claim 1, wherein the new packet originates from one of the virtual machines, and wherein applying a congestion-control policy comprises determining that the new packet is outside a congestion window, and thereafter dropping the new packet.

11. The method according to claim 1, wherein the new packet originates from one of the virtual machines, and wherein applying a congestion-control policy comprises determining that the new packet is outside a congestion window, and thereafter delaying transmission of the new packet until the new packet is no longer outside the congestion window.

12. The method according to claim 1, further comprising the steps of:
determining that one of the virtual machines has exceeded a predetermined congestion metric; and
thereafter migrating the one virtual machine to another host.

13. The method according to claim 1, further comprising the step of using the congestion state as an input for a financial charging mechanism.

14. A computer system, comprising:
a memory;
a host processor configured to access the memory and to run one or more virtual machines and a hypervisor;

network interface hardware, which is configured to transmit and receive data packets over a data network, the hypervisor and the network interface hardware being trusted components;

wherein the host processor is co-operative with the network interface hardware for performing the steps of:

communicating data packet flows to and from the virtual machines over the data network via the network interface hardware;

estimating congestion states in the data network attributable to respective packet flows;

recognizing a new packet that belongs to one of the data packet flows;

making a determination based on the congestion states that the new packet belongs to a congestion-producing packet flow; and applying a congestion-control policy to the new packet responsively to the determination, wherein the steps of making a determination and applying a congestion-control policy are performed by one or more of the trusted components, and wherein applying a congestion-control policy comprises sending a congestion-notification message to a source of the new packet, transmission of the congestion-notification message being delayed according to a class-based delay interval.

15. The system according to claim 14, wherein applying a congestion-control policy is performed by the hypervisor.

16. The system according to claim 14, wherein applying a congestion-control policy is performed by the network interface hardware.

17. The system according to claim 14, further comprising the steps of:

recognizing a failure of the new packet to arrive within a predetermined time interval; and updating the congestion states using one or more of the trusted components responsively to recognizing a failure.

18. The system according to claim 14, wherein the new packet originates from one of the virtual machines, and wherein applying a congestion-control policy comprises delaying the new packet according to the congestion state attributable to the packet flow thereof.

19. The system according to claim 14, further comprising falsifying the congestion-notification message by one or more of the trusted components.

20. A method for communication, comprising the steps of:

supporting a plurality of virtual machines in a host, wherein the host comprises a hypervisor, and network interface hardware, the hypervisor and the network interface hardware being trusted components;

communicating data packet flows to and from the virtual machines over a data network via the network interface hardware;

estimating congestion states in the data network attributable to respective packet flows;

recognizing a new packet that belongs to one of the data packet flows;

making a determination based on the congestion states that the new packet belongs to a congestion-producing packet flow; and applying a congestion-control policy to the new packet responsively to the determination, wherein the steps of making a determination and applying a congestion-control policy are performed by one or more of the trusted components, and wherein applying a congestion-control policy comprises:

sending a congestion-notification message to a source of the new packet; and falsifying the congestion-notification message by one or more of the trusted components.

21. The method according to claim 20, further comprising sending a second congestion-notification message only after elapse of a predetermined time interval after sending a first congestion-notification message.

22. The method according to claim 20, further comprising the steps of:

recognizing a failure of the new packet to arrive within a predetermined time interval; and updating the congestion states using one or more of the trusted components responsively to recognizing a failure.

23. The method according to claim 20, wherein the new packet originates from one of the virtual machines, and wherein applying a congestion-control policy comprises modifying a content of the new packet.

24. The method according to claim 20, wherein the new packet originates from one of the virtual machines, and wherein applying a congestion-control policy comprises determining that the new packet is outside a congestion window, and thereafter delaying transmission of the new packet until the new packet is no longer outside the congestion window.

* * * * *